Sept. 12, 1950  L. D. THOSTENSON  2,521,884
AUTOMATIC CLUTCH
Filed Dec. 5, 1947  2 Sheets-Sheet 1

INVENTOR.
LEWIS D. THOSTENSON
BY HIS ATTORNEYS.
HARRIS, KIECH, FOSTER & HARRIS

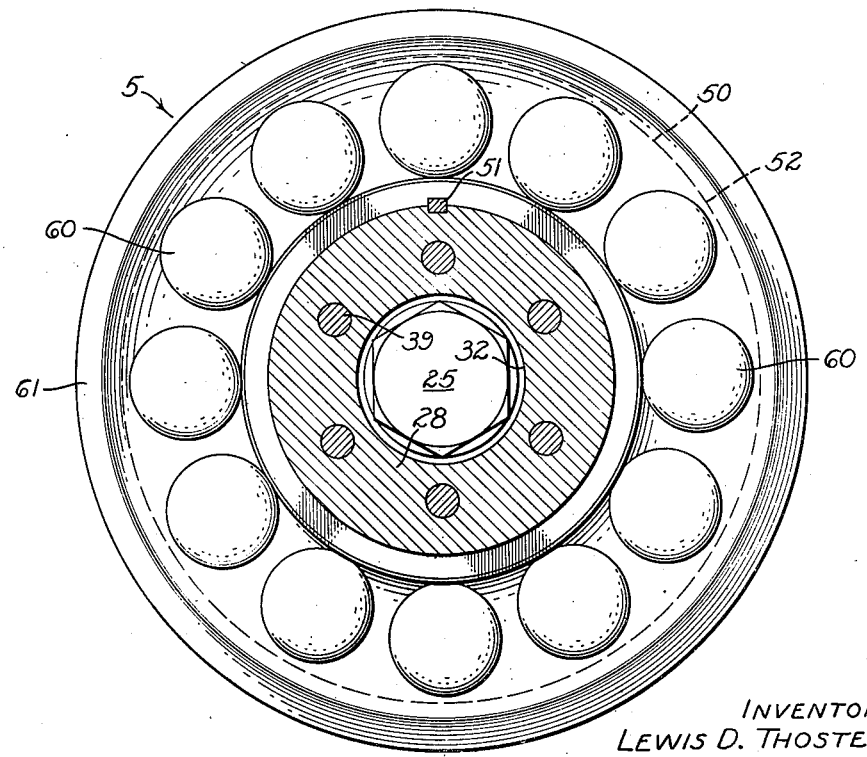

UNITED STATES PATENT OFFICE 2,521,884

AUTOMATIC CLUTCH

Lewis D. Thostenson, Inglewood, Calif., assignor to Salsbury Corporation, Los Angeles, Calif., a corporation of California Application December 5, 1947, Serial No. 789,808

1 Claim. (Cl. 74—230.24)

This invention relates generally to motor vehicles, and more particularly to an automatic clutch which is especially adaptable for use in the power drive of a motor-driven bicycle, scooter and other relatively light-weight vehicles.

It is an object of the invention to provide a motor vehicle having a power transmission in which an automatic clutch is incorporated and operative to connect and disconnect the motor at a certain critical speed thereof without attention on the part of the operator of the vehicle.

Another object of the invention is to provide, in a motor vehicle, a power transmission which permits free idling of the engine within its normal idling range, but in which the clutch is automatically engaged to cause movement of the vehicle when the speed of the engine reaches a predetermined value.

Another object of the invention is to provide, in a motor vehicle, power transmission means in which the clutch automatically maintains the engine disconnected from the drive wheel or wheels when the engine is idling so that the vehicle can be manually propelled in either forward or rearward direction.

A further object is to provide an automatic clutch which is simple in construction, economical to manufacture, easy to install and service, and one which is highly efficient in performing its intended function.

Further objects of the invention will be apparent from the following description taken in connection with the accompanying drawings, in which:

Fig. 1 is a perspective view of a motor-operated bicycle, showing the improved automatic clutch installed in the power transmission of the vehicle;

Fig. 4 is a sectional view, taken on line 4—4 of Fig. 2.

Figure 2:
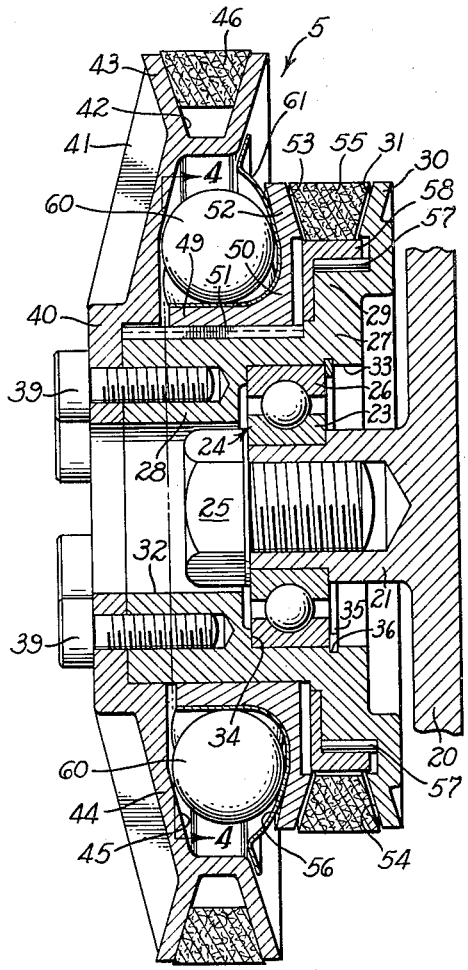
Fig. 2 is a cross-sectional view through the automatic clutch, taken on line 2—2 of Fig. 1, the clutch being shown disengaged.

Referring to the drawings in detail, my improved clutch device 5 is shown as applied to use on a motor-operated bicycle 6. The bicycle 6 may be of any conventional type consisting of a frame 7 having a vertical component or post 8, a power-driven rear wheel 9 and a steerable front wheel 10. An internal combustion engine 12 is mounted on the frame 7 and has a drive shaft 14 to which is secured a small, primary V-belt pulley 15 capable of driving a relatively large V-belt pulley 16, connected to an operative to rotate the rear wheel 9, by means to be next described.

Secured in any suitable manner to the post 8 of the frame 7 is a U-shaped bracket 20 having a horizontally projecting boss 21 which provides, in effect, a fixed countershaft or support. The end of the boss 21 is reduced in diameter to adapt it to receive the inner race 23 of an antifriction bearing 24, which may be of the ball type as herein illustrated or of the roller type. The inner race 23 is held in place on the boss 21 by means of a bolt 25 as shown in Fig. 2. The bearing 24 has an outer race 26 which supports an annular clutch-pulley member 27 to adapt the member to rotate about the axis of the boss 21. The clutch-pulley member 27 has its periphery reduced in diameter at two points so as to provide a hub portion 28 and a circular boss 29. The member 27 has an annular peripheral flange 30, one side or surface 31 of the flange being inclined with respect to the axis of the member. The clutch-pulley member 27 has a bore 32 and a counterbore 33 providing a shoulder 34 therebetween. The outer race 26 of the bearing 24 is received in the counterbore 33 to mount the member 27 for rotation on the boss 21. The race 26 is disposed against the shoulder 34 and is held thereagainst by means of a snap-ring 35 seated in a circular groove 36 formed in the counterbore 33.

Attached to the end of the hub portion 28 of the clutch-pulley member 27, by means of screws 39, is the hub portion 40 of an intermediate driving member or pulley 41 which has a V-belt groove 42 in its peripheral portion 43. Extending between the hub and peripheral portions of the pulley 41 is an annular web 44 provided with a conical, concave surface 45. A V-belt 46 is connected between and surrounds the pulleys 15 and 41 so that when the engine 12 is operating and its drive shaft 14 is rotating, the pulley 41 and the clutch-pulley member 27 connected therewith are rotated in unison on the ball bearing 24.

Slidable axially on the hub portion 28 of the clutch-pulley member 27 is the hub 49 of a second annular clutch-pulley member 50, the two members being connected for unitary rotation by means of a key 51 interposed therebetween. The member 50 has an inclined circumferential flange 52 so as to provide at one side a convex, conical face 53 which cooperates with the face 31 of the member 27 to provide an annular V-belt groove 54 therebetween. Due to the fact that the member 50 can slide axially, relative to the member 27, the conical face 53 can be moved toward and away from the corresponding face 31 of the member 27 so that a V-belt 55 disposed in the groove 54 and extending between the clutch-pulley 50, 27 and the pulley 16 can be tightened and loosened to connect and disconnect the drive between the engine 12 and the rear wheel 9. The inclined flange 52 also provides a concave, conical face 56 which is used for the purpose to be explained hereinafter.

Revolvable around the periphery of the boss 29 is a series of rollers 57 which rotatably support a ring 58 of angular cross section. The ring 58 is disposed between the clutch-pulley members 27 and 50 with its periphery located inwardly of their respective flanges 30 and 52 so that when the member 50 is shifted toward the left, as viewed in Fig. 2, and the belt 55 is permitted to move inwardly toward the axis of rotation of the clutch-pulley 27, 50, the belt 55 will seat against the ring 58 which is freely rotatable on the rollers 57. The belt 55 is thus prevented from engaging the boss 29 of the member 27 so that it cannot be driven from the member when the engine 12 is operated at low speed.

The clutch-pulley member 50 is adapted to be shifted toward the right in response to an increase in speed of the engine in excess of an idling speed by centrifugally-operated means. This last-named means consists of a series of balls 60 which are disposed in the space between the flange portion 52 of the member 50 and the web 44 of the intermediate pulley 41 and which may be carried by a spring element 61 so that the point of release of the clutch is determined by the contractive strength of the element. When the engine is stopped or is idling, the balls 60 are adapted to revolve around the hub 49 of the member 50, which is then in the position shown in Fig. 2, to permit the driving belt 55 to engage the rotatable ring 58. However, when the engine 12 is accelerated to a speed in excess of the idling speed, the balls 60 move radially outward under the influence of centrifugal force and thus engage the conical surfaces 56 and 45 of the respective parts 50 and 41.

The effect of this centrifugal wedging action is to shift the clutch-pulley member 50 toward the right so that the V-shaped groove 54 is narrowed and the belt 55 thus clutched to the rotating members 50 and 27 to be driven thereby. In this manner the driven pulley 16 and the rear wheel 9 are rotated to propel the vehicle along the ground, the speed of rotation of the wheel being proportional to the speed of the engine. Disregarding slippage, which can occur at the start of movement of the vehicle, when inertia is greatest and must be overcome, the speed ratio is governed by the relative diameters of the pulleys 15, 41, 27—50 and 16.

Figure 3:
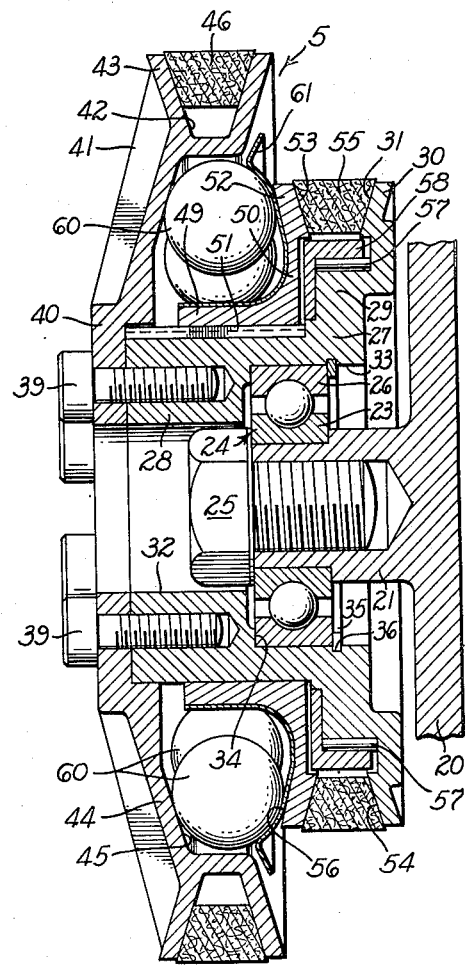
Fig. 3 is a view similar to Fig. 2 but illustrating the clutch engaged.

When it is desired to arrest the forward progress of the vehicle 6, the operator merely closes the engine throttle to retard the speed of the engine and during this time the rotative speed of the wheel 9 is reduced, the balls 60 remaining in the position shown in Fig. 3. As the speed of the engine 12 is reduced to an idling speed, however, the balls 60 are no longer subjected to centrifugal force of great magnitude and thus the balls move radially inward to permit the clutch-pulley member 50 to move toward the left (Fig. 2) and to thus slacken the belt 55 to declutch the drive so that propulsion of the vehicle is discontinued. It is thus seen that the drive is clutched and declutched automatically in response to the speed of the engine and without any effort or attention on the part of the operator of the vehicle.

When the engine 12 is inoperative or when it is idling, the vehicle can be maneuvered manually along the ground, either in a forward or rearward direction, it being noted that at this time the driving belt 55 is slack and merely rotates the ring 58 without rotating the clutch-pulley 27, 50. It will be apparent that the present improved automatic clutch is adaptable for use in various power transmission mechanisms, especially those employed in light-weight motor vehicles of the type herein illustrated or others now in use.

While I have herein shown and described the automatic clutch as embodied in a preferred form of construction, by way of example, it will be apparent that various changes might be made in the structure without departing from the spirit of the invention. Consequently, I do not wish to be limited in this respect but desire to be afforded the full scope of the appended claim.

I claim as my invention:

An automatic clutch device, comprising: a fixed support; an antifriction bearing carried by said support; retaining means for retaining said bearing on said support; a clutch pulley including a first clutch member rotatable on said bearing and having a hub, a second clutch member having a hub surrounding said hub of said first member, and key means between said first and second members for connecting said members for unitary rotation while permitting relative axial sliding movement therebetween, said members having adjacent conical faces defining a V-shaped peripheral groove therebetween, said second member having a concave tapered surface in its side opposite its conical face; a V-belt extending around said clutch pulley in said groove thereof and adapted to transmit power to a driven pulley; a rotary driving member connected to said hub of said first clutch member and adapted to be rotated at different speeds, said driving member having a concave tapered surface in its side adjacent said second clutch member, said tapered surfaces of said driving member and said second member defining therebetween an annular space of decreasing width in a direction radially outward from the axis of rotation of said driving member and said clutch pulley, said driving member having a peripheral portion overhanging said annular space and formed with a V-groove; a V-belt disposed in said last-named V-groove and adapted to be driven from a prime mover; and centrifugally operated balls disposed in said annular space and engageable with said tapered surfaces of said driving member and said second clutch member, said balls being operative, in response to increase and decrease in the rotative speed of said driving member above and below a predetermined value, to slide said second member toward and away from said first member so as to narrow and widen said groove to tighten and loosen said belt.

LEWIS D. THOSTENSON.

REFERENCES CITED

The following references are of record in the file of this patent:

UNITED STATES PATENTS

| Number | Name | Date |
|---|---|---|
| 729,197 | Mathieu | May 26, 1903 |
| 1,766,227 | Russell | June 24, 1930 |
| 2,104,074 | Erbach | Jan. 4, 1938 |
| 2,155,351 | Paulus | Apr. 18, 1939 |
| 2,180,217 | Thomas | Nov. 14, 1939 |
| 2,331,976 | Hare | Oct. 19, 1943 |